United States Patent

[11] 3,572,819

| [72] | Inventors | James C. Moore<br>Portland;<br>Milton K. Leonard, Lake Oswego, Oreg. |
|---|---|---|
| [21] | Appl. No. | 815,613 |
| [22] | Filed | Apr. 14, 1969 |
| [45] | Patented | Mar. 30, 1971 |
| [73] | Assignee | Tube-Lok Products<br>Portland, Oreg. |

[54] ENCLOSED GUARD CANOPY FOR TRACTORS
2 Claims, 7 Drawing Figs.

[52] U.S. Cl. .................................................. 296/102
[51] Int. Cl. ..................................................... B62d 25/06
[50] Field of Search .......................................... 296/102;
280/28.21, 150 (B)

[56] References Cited
UNITED STATES PATENTS

| 3,203,728 | 8/1965 | Wood | 296/102 |
| 3,341,247 | 9/1967 | Martinmaas | 296/28(.21) |
| 3,443,833 | 5/1969 | Miller et al. | 296/102 |
| 3,450,430 | 6/1969 | Wendt et al. | 296/28(.21) |

Primary Examiner—Leo Friaglia
Assistant Examiner—Robert R. Song
Attorney—Eugene D. Farley ABSTRACT: An enclosed guard canopy for tractors comprises a supporting guard frame defining an operator's cab having side openings. Sheet metal panels are hung in the openings by being secured to the guard members only. Resilient mountings mount the guard members on the tractor and flexible resilient sealing strips seal the space between the unattached lower margin of the panels and the top of the tractor. The operator in the cab thus is protected from vibration, noise and dirt and the cab structure is protected from working stresses.

PATENTED MAR 30 1971
3,572,819
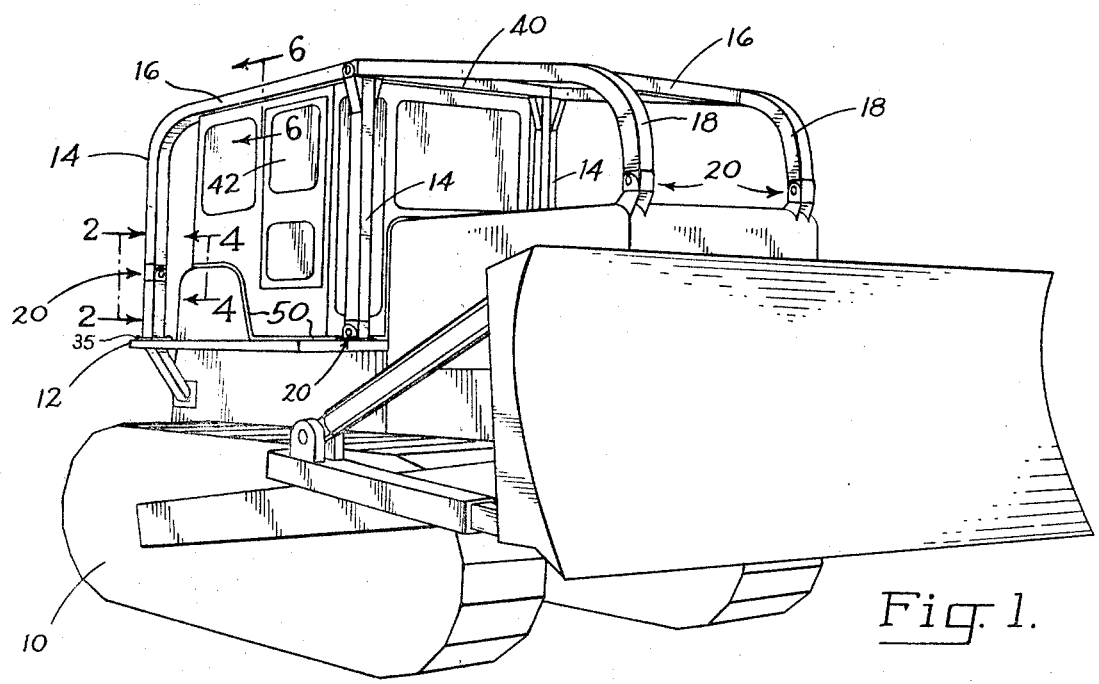
Fig. 1.
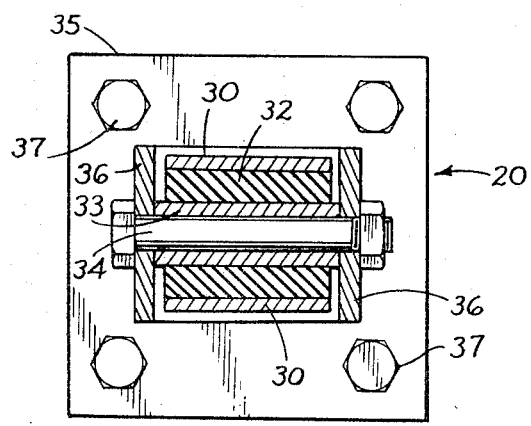
Fig. 3.
Fig. 4.   Fig. 5.
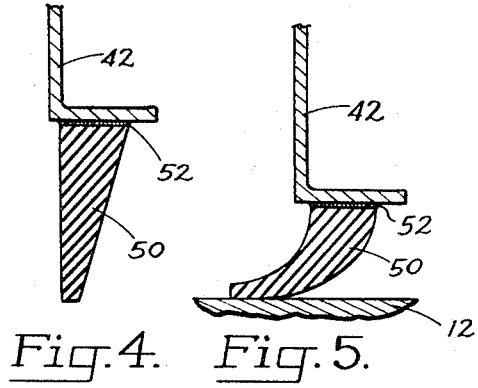
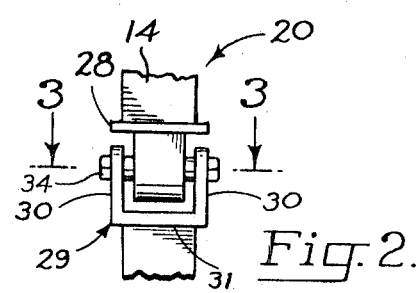
Fig. 2.
James C. Moore
Milton K. Leonard
BY            INVENTORS
Eugene D. Farley
Atty.
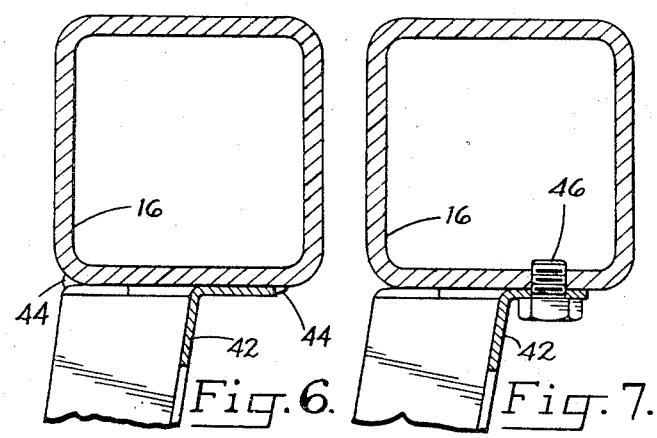
Fig. 6.   Fig. 7.

3,572,819

ENCLOSED GUARD CANOPY FOR TRACTORS

Self-propelled earth-moving equipment including bulldozers, tractors, excavators, backhoes and the like, hereinafter generically referred to as "tractor," customarily are provided with a guard canopy consisting of a strong rigid frame. This defines the operator's cab and protects the operator in the event of rollover. It also protects him from falling objects, and tree branches or other material which the tractor pushes aside during its operation.

Further to protect the operator, the cab usually is enclosed with panels provided with the necessary disposition of windows and doors, and it is to the manner of inclusion of such panels that the present invention is directed.

Normally the panels comprise stiff metal sheets rigidly connected to the tractor itself. This manner of mounting is disadvantageous since the vibration and twisting inherent in tractor operation is transmitted directly to the guard canopy and in particular to the panels, which accordingly work loose in their mountings and may even be damaged structurally.

It is the general purpose of the present invention to provide a tractor guard canopy including enclosure panels which, instead of being fixed to the tractor, are hung from the structural guard elements and hence are free from the above noted deficiency. In addition, the resulting enclosed guard canopy is characterized by the following advantages.

1. It is effectively sealed and accordingly protects the operator not only from the weather, but also from dust, noise and vibration.
2. the enclosure panels stiffen the structural guard elements and greatly increase the strength of the combination, thereby further protecting the operator in case of tractor rollover.
3. Not being connected directly to the tractor, the enclosure panels and the windows and doors mounted therein are protected from severe stresses occurring during operation of the tractor and hence have a relatively long service life.
4. The enclosure panels, and indeed the entire guard canopy assembly, may be easily mounted and demounted from the tractor.
5. Hanging the panels from the structural members allows for variances in manufacturing tolerances, thereby making critical fits unnecessary.
6. The manner of mounting the enclosure panels also permits the efficient application of air conditioning equipment to the tractor cab.

The manner in which the foregoing and other object of the invention are accomplished will be apparent from the accompanying specification and claims, considered together with the drawings wherein:

FIG. 1 is a view in perspective of a tractor fitted with the presently described enclosed guard canopy;

FIG. 2 is a fragmentary view in side elevation taken along lines 2—2 of FIG. 1, illustrating a flexible mounting which may be employed in the guard canopy.

FIG. 3 is a section on line 3—3 of FIG. 2, further illustrating the construction of the flexible mounting;

FIGS. 4 and 5 are enlarged, detail, transverse, sectional views along line 4—4 of FIG. 1 illustrating sealing means employed for sealing off the enclosed guard canopy of the invention, in inoperative and operative positions, respectively; and FIG. 6 and 7 are transverse sectional views in enlarged detail taken along line 6—6 of FIG. 1 and illustrating two alternative means of mounting enclosure panels included in the guard canopy assembly.

As illustrated in FIG. 1, the tractor 10 is provided in conventional manner with a deck 12. Mounted on the deck are a plurality of vertical posts 14 interconnected by a plurality of horizontal connecting members 16. Brush-deflecting sweeps 18 interconnect the forward end of the guard canopy with the front end of the tractor.

All of these framing members are fabricated from stout structural material, as the rectangular metal tubing illustrated in FIGS. 6 and 7. The vertical framing members are insulated from flexing and vibration by means of the special mounts indicated generally at 20. One such mount is illustrated in detail in FIGS. 2 and 3. It is of known construction, but is representative of flexible mounts which may be employed to advantage in the herein described enclosed guard canopy.

As illustrated, post mounting 20 includes a bushing housing 29 which preferably is rectangular in shape, open on two sides, with two opposite vertical walls on the other two sides. In the arrangement shown a bushing housing 29 is secured to the bottom of each of the four posts of the guard canopy Two sidewalls of the housing are indicated at 30 and the bottom wall at 31.

A bushing 32 of rubber or similar resilient material fills housing 29. The bushing is bonded to the housing by vulcanization or other suitable means. A central channel is provided through the bushing parallel to the sidewalls 30 and parallel to the bottom wall 31 of housing 29.

A tubular metal sleeve 33 extends through this channel. The bushing is bonded similarly to the outside of the metal sleeve. The ends of sleeve 33 terminate a short distance beyond the bushing and housing. The shaft of a mounting bolt 34 extends through sleeve 33.

The housing is welded to and formed integral with a top plate 28. The housing assembly including plate 28 is secured to the bottom of the guard canopy post by welding.

The other portion of the mounting assembly includes a base plate 35 which is rigidly secured on a mounting bracket of the main frame of the tractor by a plurality of bolts 37, or by welding.

Mounting bolt 34 is supported in mounting plates 36. It extends through a pair of horizontally lines apertures, as shown. The height at which the apertures are positioned above the top of base plate 35 is greater than the distance between the bottom wall 31 of housing 29 and sleeve 33 in bushing 32, thus causing the bottom wall 31 of housing 20 to be spaced above base plate 35. Consequently bushing 32 keeps housing 29 spaced from base plate 35 and mounting plates 36 so that there is no metal-to-metal contact between the two portions of the mounting assembly for post 14.

The spacing surrounding housing 29 and the resilient connection provided through the intermediary of bushing 32 makes it possible for relative motion in any direction to take place between base plate 35, and thus the tractor frame to which the base plate rigidly is secured.

With all four posts of the guard canopy frame secured in place on the tractor by such flexible mounting means, the slight twisting and bending to which the tractor frame invariably must be subjected at times under heavy duty will be absorbed by the flexible mounts for the guard canopy posts, thus protecting the guard canopy frame from the effect of any such transmitted strains.

In the openings defined by the guard canopy structural members thus described, there are hung enclosure panels two of which are illustrated in FIG. 1.

A front panel 40 is fitted with a windshield of suitable dimensions. A side panel 42 is fitted with a hinged door and with a window. The other side panel and back panel may similarly be fitted with doors and windows as required.

All of the enclosure members are fabricated from stiff sheet metal and are hung from the frame rather than being supported from the tractor deck, and with their lower margins being spaced from the latter. Two means of hanging the panels are illustrated in FIGS. 6 and 7.

In the FIG. 6 embodiment, panel 42 is hung on frame members 14 and 16 by being secured with welds 44. In the FIG. 7 embodiment, panel 42 is hung on frame members 14, 16 by being secured with bolts 46. Use of bolts has the advantage of facilitating removal of the panels when this is desired, as in hot weather, or for servicing.

The enclosure panels thus are sealed to the framing members on both sides and the top. Special seal means also are provided for sealing the bottom margins of the panels. These are illustrated in FIGS. 4 and 5.

Each seal means comprises a flexible resilient strip 50 which may be fabricated from natural or synthetic rubber, or similar material. Each strip is board at its base and tapers outwardly to a flexible outer margin.

It is cut to conform to the lower margin of the enclosure panel to which it is to be applied. Although various means of application may be employed, it is preferred to affix it to the enclosure panel by means of an adhesive 52.

Strip 50 has a width somewhat greater than the space between the lower margin of the enclosure panel to which it is attached, and the tractor deck immediately below. Accordingly, when the enclosure panel is fitted in place, the strip is deformed from its nonoperative position of FIG. 4 to its operative position of FIG. 5. In its operative position it bears resiliently but securely against deck 12, being flexed outwardly rather than inwardly.

When mounted in this manner strip 50 seals off effectively the space beneath the enclosure panels. At the same time, it permits the escape of water and debris in the event that the tractor deck is hosed off.

In this manner there has been provided an enclosed tractor guard canopy in which the vibration and flexing inherently produced during operation of the tractor are transmitted to the canopy in minimum amount. This not only preserves the canopy from damage, but also relieves the operator from fatigue. In addition, the cab interior in which he works is sealed effectively from noise and dirt further increasing the efficiency and comfort with which the unit may be operated.

We claim:

1. An enclosed guard canopy for tractors comprising:
   a. a plurality of interconnected vertical and horizontal structural guard members defining an operator's cab having at least one side opening;
   b. flexible mounting means mounting at least some of the vertical guard members on the tractor in cab-forming relation;
   c. panel means dimensioned for mounting in the opening;
   d. panel securing means securing the panel means to the guard members only;
   e. the panel means thereby being hung from the guard members with its lower margin spaced from the tractor; and
   f. flexible sealing strip means connected to the lower margin of the panel means, bearing against the upper surface of the tractor, and sealing the space between the panel margin and the tractor.

2. An enclosed guard canopy for tractors, comprising:
   a. a plurality of interconnected vertical and horizontal structural guard members defining an operator's cab having at least one side opening;
   b. mounting means for mounting the guard members on the tractor in cab-forming relation;
   c. panel means dimensioned for mounting in the opening;
   d. panel securing means for securing the panel means to the guard members only, the panel member thereby being hung from the guard members with its lower margin being spaced from the tractor; and
   e. resilient strip means connected to the lower margin of the panel and sealing the space between said margin and the tractor, the sealing strip means comprising a flexibly resilient strip of rubber having a base adherently united to the panel margin and an outer portion bent outwardly with respect to the interior of the cab and bearing against the upper surface of the tractor.